UNITED STATES PATENT OFFICE.

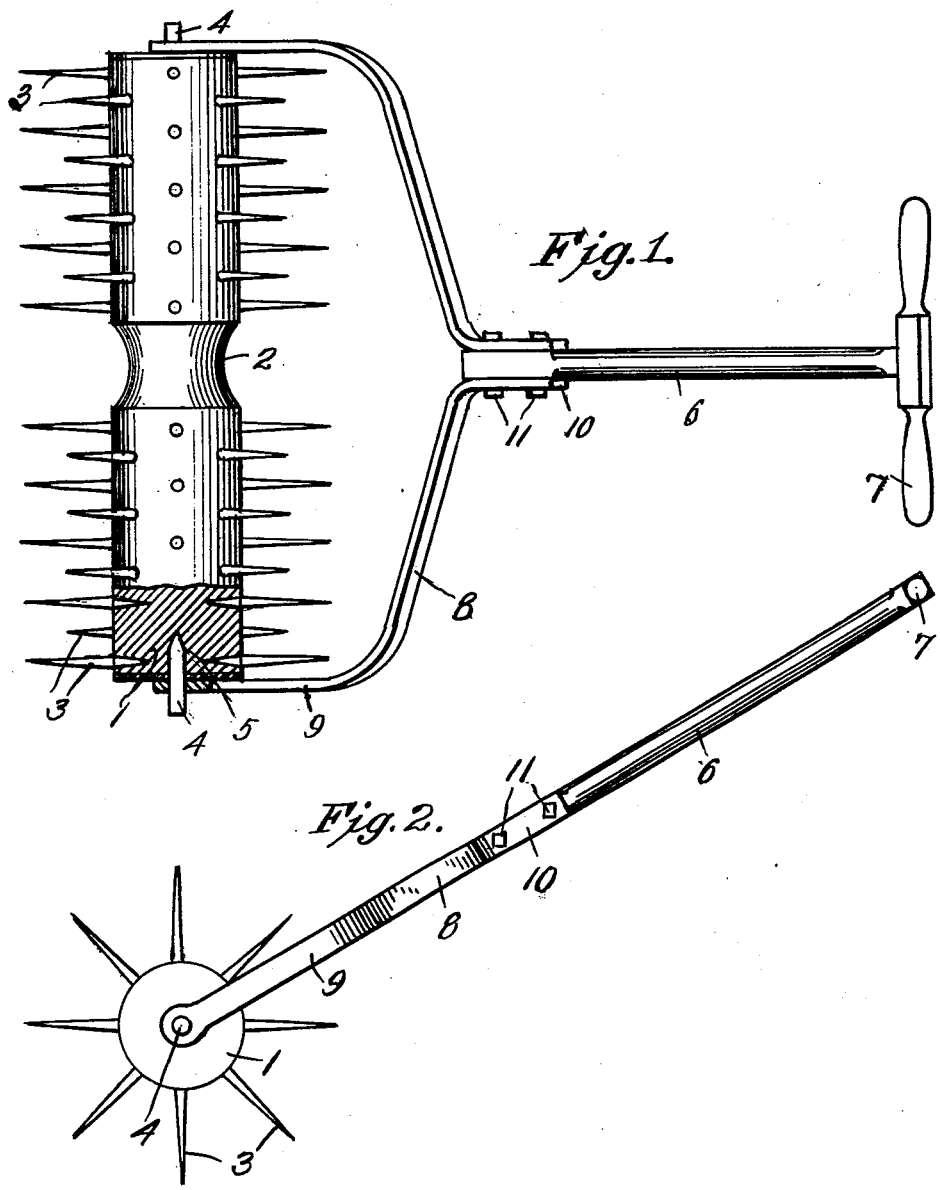

DOMENICK IODICE, OF WATERTOWN, MASSACHUSETTS.

SOIL-PULVERIZER.

1,305,215.     Specification of Letters Patent.     Patented May 27, 1919.

Application filed November 12, 1918. Serial No. 262,156.

*To all whom it may concern:*

Be it known that I, DOMENICK IODICE, a citizen of the United States, residing at Watertown, in the county of Middlesex and State of Massachusetts, have invented certain new and useful Improvements in Soil-Pulverizers, of which the following is a specification.

My invention relates to new and useful improvements in a soil pulverizer and has for its principal object the construction of a device of this character which is simple and inexpensive in construction and which may be operated by hand.

Another object of the invention is the provision of a roller having a plurality of spikes secured thereto and such spikes arranged in such a manner as to leave a space in the center of the roller for straddling the row of vegetation being cultivated.

A further object of the invention is the construction of the roller spikes in such a manner that they may be driven into the roller in the desired positions.

Still another object of the invention is the provision of a handle for the roller so constructed that it may be easily applied to the roller or disconnected therefrom.

With these and other objects in view my invention consists in the novel details of construction and arrangement of parts as will be more clearly understood from the following specification and drawings in which:

Figure 1 is a top plan, partly in section showing the manner of connecting the spikes to the roller, and Fig. 2 is a side elevation.

In the drawing the numeral 1 indicates a roller which is preferably of wood and this roller is provided intermediate its ends, and preferably in the center, with a grooved or concaved portion 2 for the purpose as will be presently described. A plurality of spikes 3 are adapted to be connected to the roller, on each side of the groove 2, and these spikes are preferably pointed at each end so that one end may be driven into the roller and the opposite end used for pulverizing the soil. The spikes are arranged in rows as indicated and the spikes of one row preferably alternate with the spikes of the adjacent rows so that the spikes of the different rows will be in staggered relation to thoroughly pulverize the soil.

A peg 4 having a pointed end 5, is driven in each end of the cylinder 1 to form a bearing for a handle connection which will be later described. Of course it will be understood that these pegs are driven centrally of the end so that the proper rotation of the roller may be secured.

At 6 I have indicated a handle provided at the top with the cross piece 7 and this handle is adapted to be secured to the roller 1 by means of the strap pieces 8 which are of the shape shown. These strap pieces 8 have the downwardly extending portions 9 provided with a hole in the lower end to receive the pegs 4 and the upper end of each strap is provided with the upwardly extending portion 10 adapted to lie against the end of the handle 6 as is more particularly illustrated in Fig. 1 of the drawings. Bolts 11 are adapted to pass through the extensions 10 and the end of the handle for securing the straps to the handle. It will be understood that the openings in the extensions 9, receiving the pegs 4, are of sufficient diameter to allow the pegs to freely rotate therein.

From the above detailed description it is thought that the advantages and mode of operation will be clearly understood. As stated in one of the objects of the invention I have provided a soil pulverizer which is simple and inexpensive in construction and which may be easily operated by hand to cultivate the ground. The roller 1 being provided in the center with the groove 2 will allow the spikes to operate on each side of a row of vegetation and the plants, when they have come out of the ground, will be received under the grooved part of the roller and will not be injured. The spikes are of such a construction that they may be easily driven into the wood roller and if a spike should be broken it can be removed and a new one replaced therein. The pegs 4 also form an easy means of connecting the roller to the handle and if a peg should become broken it can be easily replaced. It will also be seen that I have provided a handle of such construction that it may be easily connected or disconnected from the roller should it be desired to insert a new roller or to provide a new handle for one which has become broken.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having fully described my invention what I claim as new and desire to secure by Letters Patent is:

1. A soil pulverizer comprising a handle, a roller rotatably mounted in the handle and provided with a groove intermediate its ends, and spikes secured to the roller on each side of the groove.

2. A soil pulverizer comprising a handle, a roller rotatably mounted in the handle and provided with a groove intermediate its ends, and a plurality of rows of spikes secured to the roller on each side of the groove, said spikes of the rows being arranged in staggered relation.

3. A soil pulverizer comprising a roller having a groove intermediate its ends, a plurality of spikes arranged on the roller on each side of the groove, pegs secured on each end of the roller, and a handle pivotally mounted on the pegs.

In testimony whereof I affix my signature in presence of two witnesses.

DOMENICK IODICE.

Witnesses:
CLEMENTE IODICE,
FELICE OLIVERI.